United States Patent [19]

Kassab et al.

[11] Patent Number: 5,774,285
[45] Date of Patent: Jun. 30, 1998

[54] SELECTION OF OPTIMAL READ/WRITE CHANNEL PARAMETERS IN A HARD DISC DRIVE

[75] Inventors: Roger J. Kassab, Shrewsbury, Mass.; Ghassan M. Abdelnour, Oklahoma City, Okla.

[73] Assignee: Seagate Technology, Inc., Scotts Valley, Calif.

[21] Appl. No.: 622,665

[22] Filed: Mar. 26, 1996

Related U.S. Application Data

[60] Provisional application No. 60/003,330, Sep. 6, 1995.
[51] Int. Cl.$^6$ .............................. G11B 27/36; G11B 5/02; G11B 5/09
[52] U.S. Cl. ................................ 360/31; 360/46; 360/25; 360/53
[58] Field of Search ................................. 360/31, 46, 53, 360/25; 369/53

[56] References Cited

U.S. PATENT DOCUMENTS

| 4,821,125 | 4/1989 | Christensen et al. . |
| 5,047,876 | 9/1991 | Genheimer et al. . |
| 5,107,378 | 4/1992 | Cronch et al. . |
| 5,262,907 | 11/1993 | Duffy et al. . |
| 5,430,768 | 7/1995 | Minuhin et al. . |
| 5,459,757 | 10/1995 | Minuhin et al. . |

*Primary Examiner*—Aristotelis M. Psitos
*Assistant Examiner*—Regina Y. Neal
*Attorney, Agent, or Firm*—Bill D. McCarthy; Edward P. Heller, III; Randall K. McCarthy

[57] ABSTRACT

Method for optimizing parameter values in a read/write channel of a disc drive. A population of error rate points is obtained from selected ranges of a plurality of read/write channel parameters, each error rate point corresponding to a unique combination of parameter values and having an associated error rate value. A weight is determined for each of the error rate points through normalization to the minimum error rate value in the population. A threshold value is determined based upon the error rate values in a plurality of nominally identical disc drives and the weights are compared to the threshold value. Those error rate values having weights less than the threshold are selected and a center of gravity is determined therefrom. At such times that the entire population of error rate values has weights greater than the threshold value, the optimum parameter values are those that map to the center of gravity. Otherwise, for each error rate value having a weight greater than the threshold, the average and standard deviation are determined for neighboring (immediately adjacent) error rate values and the error rate value having the tightest distribution in the neighboring error rate values provides the optimum parameter values.

9 Claims, 5 Drawing Sheets

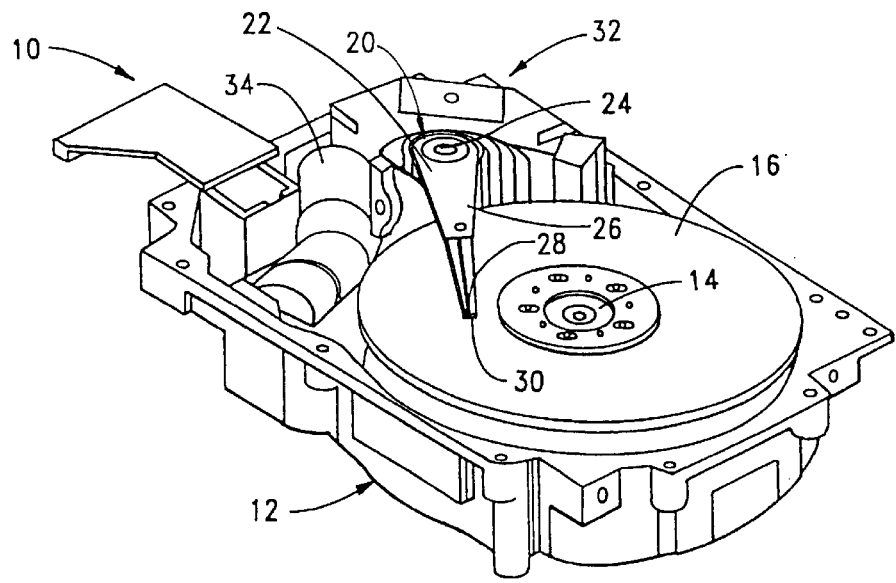
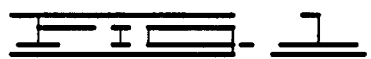
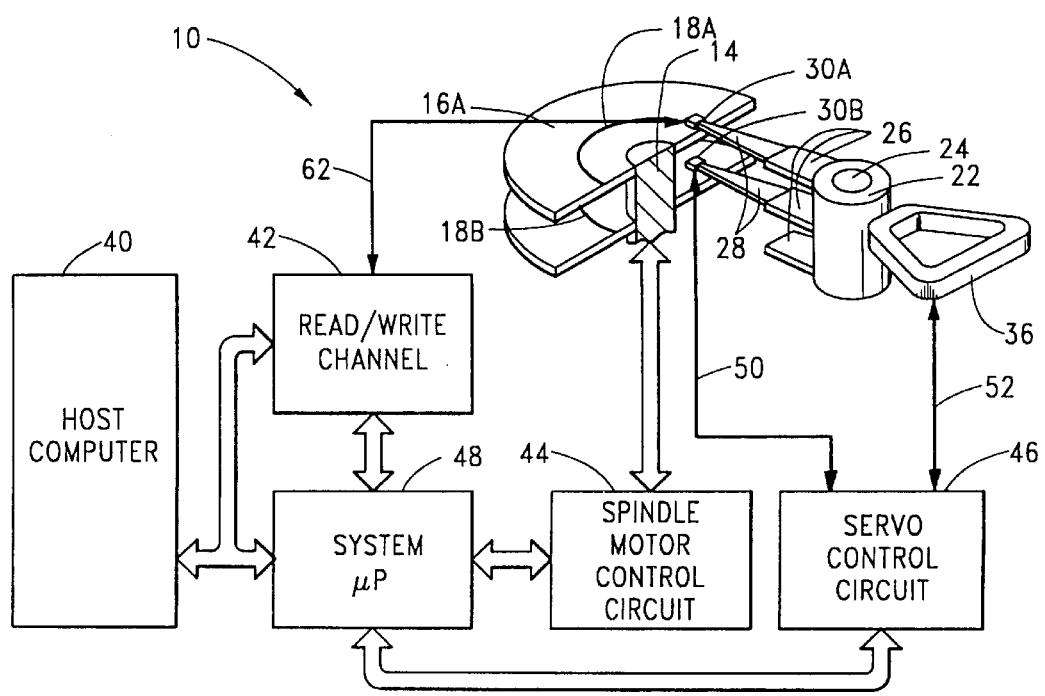
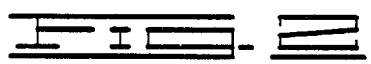

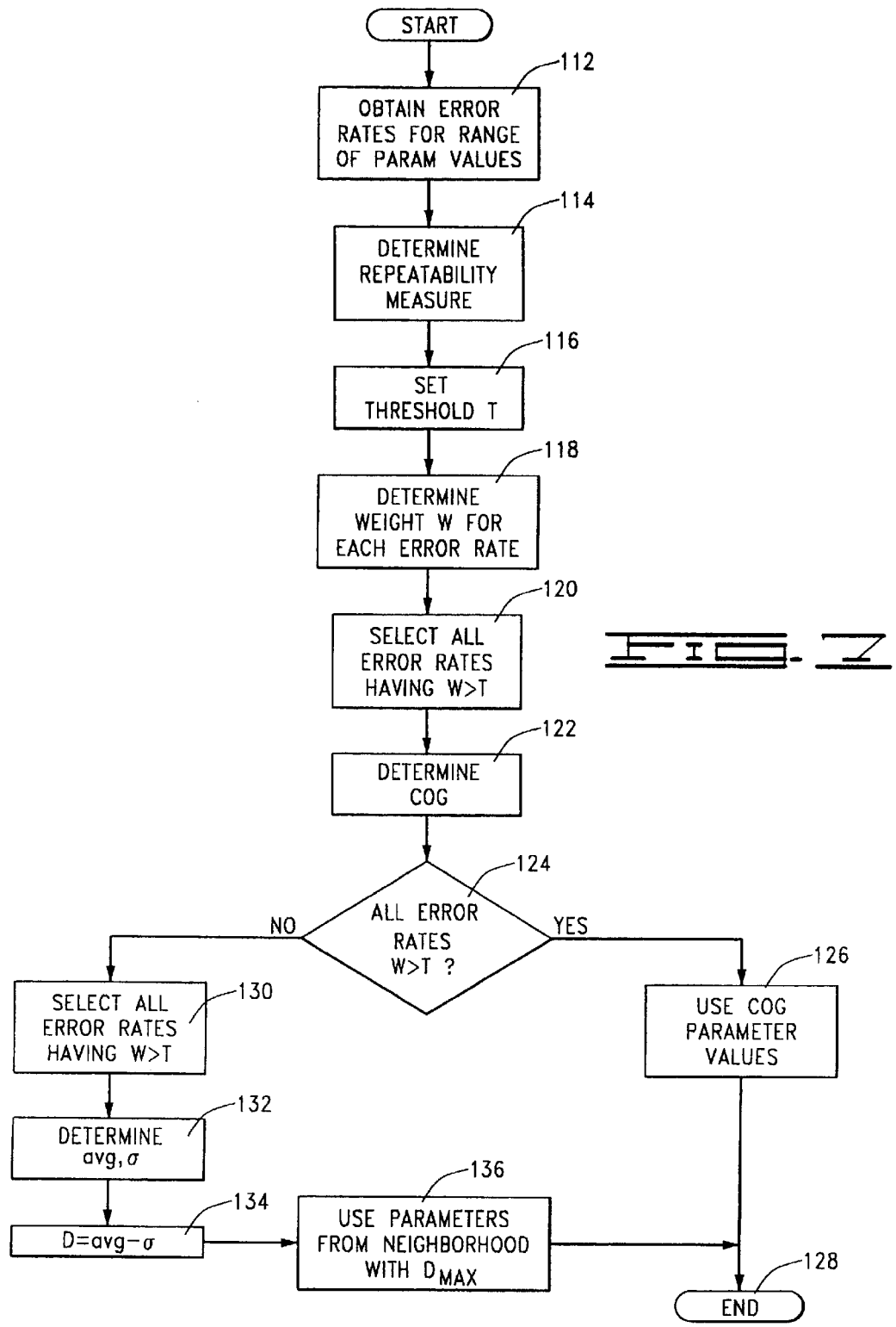

SELECTION OF OPTIMAL READ/WRITE CHANNEL PARAMETERS IN A HARD DISC DRIVE

This application claims the benefit of U.S. Provisional Application No. 60/003,330 filing date Sep. 6, 1995.

BACKGROUND OF THE INVENTION

1. Field of the Invention

This invention relates generally to the field of disc drive data storage devices, and more particularly, but not by way of limitation, to a method for selecting the values of disc drive read/write channel parameters to optimize the disc drive performance.

2. Discussion

Modern hard disc drives comprise one or more rigid discs that are coated with a magnetizable medium and mounted on the hub of a spindle motor for rotation at a constant high speed. Information is stored on the discs in a plurality of concentric circular tracks by an array of transducers ("heads") mounted for movement to an electronically controlled actuator mechanism.

The most common type of actuator mechanism is the rotary voice coil actuator, which employs a voice coil motor. With this type of actuator, the heads used to write and read data are mounted via flexures at the ends a plurality of arms which project radially outward from a substantially cylindrical actuator body. The actuator body is journaled via ball bearing assemblies to rotate about a pivot shaft which is mounted to the disc drive housing at a position closely adjacent the outer extreme of the discs. The pivot shaft is parallel with the axis of rotation of the spindle motor and the discs and the heads move in a plane parallel with the surfaces of the discs.

The actuator voice coil motor includes a coil mounted on the side of the actuator body opposite the head arms so as to be immersed in the magnetic field of an array of permanent magnets. When controlled DC current is passed through the coil, an electromagnetic field is set up which interacts with the magnetic field of the magnets and causes the coil to move in accordance with the well-known Lorentz relationship. As the coil moves relative to the magnets, the actuator body pivots about the pivot shaft and the heads are moved across the disc surfaces.

Typically, the heads are supported over the discs by slider assemblies which include air-bearing surfaces designed to interact with a thin layer of moving air generated by the rotation of the discs, so that the heads are said to "fly" over the disc surfaces. Generally, the heads write data to a selected data track on the disc surface by selectively magnetizing portions of the data track through the application of a time-varying write current to the head. In order to subsequently read back the data stored on the data track, the head detects flux transitions in the magnetic fields of the data track and converts these to a signal which is decoded by a read channel circuit of the disc drive.

There are various known constructions for disc drive read channels and one well known variety employs "peak-detection", wherein peaks in the signal induced in the head are detected and these detected peaks are used to decode and reconstruct the stored data. More recently, the trend has been to move to read channels employing "partial response, maximum likelihood detection", or PRML, in which the stored data is reconstructed using a plurality of adjacent intervals in the signal from the head. Partial response signaling is used to control intersymbol interference (ISI) and the effects of noise are minimized by the use of maximum likelihood detection of the magnetization of segments of the data track. To this end, the pulsed signals corresponding to individual flux transitions are filtered to a signal which, in the absence of noise, would have a nominal form. The signals are then sampled at times determined in relation to this nominal form for maximum likelihood detection in which each bit of encoded data is recovered in the context of the sequence of bits that were written to the disc to limit the effect of noise.

PRML signal processing places stringent requirements on filtering of the signals induced in the read head prior to maximum likelihood detection. To achieve satisfactory results, the filtering must be performed in both the frequency-domain (to minimize the effects of noise) and in the time-domain (to obtain a particular waveform with known and controlled ISI, which can subsequently be descrambled in a maximum likelihood detector). While maximum likelihood detection limits the effect of noise and ISI, the variances between the nominal, ideal form to which the signal induced in the read head is to be filtered and the actually realized filtered signal constitute systematic noise which can generate errors in data recovery.

Additionally, read channel transfer rates in a disc drive are not constant; that is, because the discs rotate at constant speed and a relatively uniform areal recording density is employed in the recording of data, the transfer rate of data from a data track at the outermost radius of the disc will be about three times the transfer rate for a data track at the innermost radius. This requires a corresponding frequency scaling in the filtering system as the read head moves with respect to disc radius.

Moreover, the form of the signal induced in an inductive head (or AC sense circuitry used with magneto-resistive heads) varies not only from drive to drive, but also among heads within each drive. For economic reasons, obtaining sufficient yields in manufacturing of inexpensive disc drives necessitates the allowance of relatively loose tolerances in the variations of head-media components.

Thus, because of these and other factors, the read/write performance of modern disc drives is typically optimized through the selection of appropriate parameter values used by the disc drive electronics. That is, the hardware components of the disc drive are selected to be nominally identical and then electronic parameter values are utilized to adjust the performance of each drive to an optimum level.

It is common during the manufacture of disc drives to include steps wherein the parameter values to be used by the drive are selected. Such parameters are well known to include (but are not limited to) bandwidth, slimming, write precompensation, filtering and read current level parameters. See, for example, U.S. Pat. No. 5,107,378 entitled ADAPTIVE MAGNETIC RECORDING AND READ-BACK SYSTEM, issued Apr. 21, 1992 to Cronch and Stone, as well as U.S. Pat. No. 5,047,876 entitled ADAPTIVE PREWRITE COMPENSATION APPARATUS, issued Sep. 10, 1991 to Genheimer and Holsinger. Both of these references are assigned to the assignee of the present application and incorporated herein by reference.

In the past, the particular values for these parameters have been generally established through the evaluation of the effects of changes in these values upon externally observable performance of the drive. For example, one of the above parameters may be initially set to a nominal value, which is then adjusted accordingly until the overall read error rate (that is, the number of read errors per total bits read) reaches an acceptable level, after which time that value of that parameter is stored and subsequently used by the drive during normal operations. For an example, see U.S. Pat. No. 4,821,125 entitled COMPENSATION OF WRITE CURRENT AND DELTA-V FOR RECORDING COMPONENT AND RADIAL POSITION, issued Apr. 11, 1989 to Christensen et al. (disclosing optimization of write current levels based upon resulting read error rates).

Some prior art parameter selection approaches use what may be described as a "first minimum" approach, in that generally the first parameter value found to provide acceptable disc drive performance is saved and subsequently used by the drive. Additionally, an "absolute minimum" approach has been used wherein the effects on drive performance are evaluated over a range of parameter values, and the parameter value providing the "best" performance (such as the lowest error rate) is chosen.

An important limitation in such approaches is that the effects on drive performance over a range of parameter values is not generally evaluated in terms of neighboring parameter values; that is, a particular parameter value may provide the best overall performance, but the shape of a distribution curve plotted from all of the parameter values may show that this parameter value exists at a localized peak, so that small changes in the parameter value (which commonly occur as a result of changes in environmental conditions) will result in relatively large changes in the performance measure of the drive. In such a case, other parameter values from the distribution curve may be more desirably selected from regions of the curve which exhibit more stable, robust characteristics (that is, small changes in the parameter value provide relatively small corresponding changes in drive-performance). It is to such considerations in the selection of parameters for a disc drive that the present invention is directed.

SUMMARY OF THE INVENTION

The present invention provides a method for selecting the optimal values for multiple disc drive read/write channel parameters in order to optimize the disc drive performance. A population of error rate operational points for the disc drive is obtained from selected ranges of a plurality of read/write channel parameters, with each point corresponding to a unique combination of parameter values and having an associated error rate value. A weight is determined for each of the error rate points through normalization to the best error rate value in the population. A threshold value is determined based upon the repeatability of the error rate values in a plurality of nominally identical disc drives and the weights are compared to the threshold value. Those error rate points having weights greater than the threshold are selected and a center of gravity is determined therefrom.

At such times that the entire population of error rate points has weights greater than the threshold value, the optimum parameter values are those that map to the center of gravity. Otherwise, for each error rate point having a weight greater than the threshold, the average and standard deviation are determined for neighboring (immediately adjacent) error rate points and the error rate point having the tightest distribution in the values of the neighboring error rate points provides the optimum parameter values.

An object of the present invention is to select the values for parameters used in a disc dive read/write channel in order to optimize the performance of the disc drive.

Another object of the present invention is to accomplish simultaneous optimization for any number of read/write channel parameters.

Yet another object of the present invention is to select the values for the parameters using both actual error rates as well as the differences in neighboring error rate values.

Other objects, advantages and features of the present invention will be apparent from the following description when read in conjunction with the drawings and appended claims.

BRIEF DESCRIPTION OF THE DRAWINGS

FIG. 1 is a perspective view of a disc drive in which the present invention is particularly useful.

FIG. 2 is a functional block diagram of the disc drive of FIG. 1.

FIG. 7 is a generalized flow chart illustrating the steps of the preferred embodiment of the method of the present invention.

FIG. 8 is a graphical representation of minimum error rate portions shown in FIG. 6.

DETAILED DESCRIPTION OF THE PREFERRED EMBODIMENT

Figure 3:
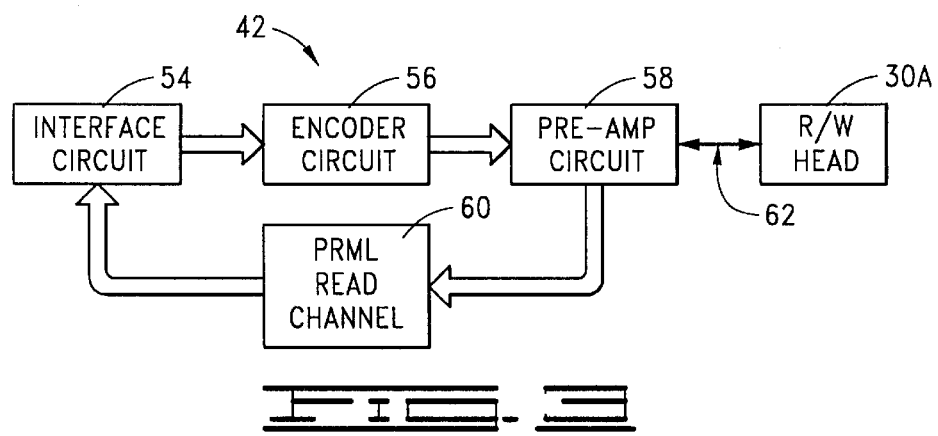
FIG. 3 is a functional block diagram of the read/write channel of FIG. 2.

Turning now to the drawings and more particularly to FIG. 1, shown therein is a perspective view of a disc drive 10 of the type in which the present invention is particularly useful. The disc drive 10 includes a housing base 12 and a top cover (not shown) which cooperatively engage to form a sealed housing which serves to protect delicate internal components from external contaminants.

A plurality of discs 16 are mounted for rotation on a spindle motor hub 14. An actuator assembly 20 adjacent the discs 16 comprises an actuator body 22 that pivots about a pivot shaft 24. The actuator body 22 includes arms 26 that extend radially as shown from the actuator body 22, and flexures 28 extend from each of the arms 26. Mounted at the distal end of each of the flexures 28 is a head 30.

The radial positioning of the actuator assembly 20, and hence the heads 30 with respect to the discs 16 is accomplished using a voice coil motor (VCM) 32. The VCM 32 is driven by electronic circuitry (not shown in FIG. 1) and signals used to control the VCM 32, as well as signals to and from the heads 30, are passed via a flex circuit 34.

Referring to FIG. 2, shown therein is a simplified functional block diagram of the disc drive 10 of FIG. 1, operably connected to a host computer 40. More particularly, FIG. 2 shows the disc drive 10 to comprise a read/write channel 42, a spindle motor control circuit 44 and a servo control circuit 46, all operably connected to and controlled by a system microprocessor 48.

It will be recognized that the spindle motor control circuit 44 operates to control and maintain the rotational speed of the discs 16 during normal disc drive operation. It is typical for disc drives to use brushless dc motors that are commutated using back emf sensing in order to maintain rotation of the discs 16 at a constant operational speed. The servo control circuit 46 operates to maintain the relative position of heads (two shown at 30A, 30B) with respect to tracks 18A, 18B on discs 16A, 16B, whether during seeking, writing or reading operations. More particularly, the servo control circuit 46 receives servo burst information on signal path 50 from the head 30B, and in response thereto generates a servo position error (SPE) signal which is used to generate and output a correction signal on signal path 52 to a coil 36 of the VCM 32 in order to correct the position of the heads 30A, 30B in accordance with the servo position error. Additionally, at such times that the system microprocessor 48 indicates that a seek is to be performed, the spindle motor control circuit 44 provides the appropriate current profile on signal path 52 to move the coil 36, and thus the heads 30A, 30B to the desired tracks 18A, 18B. For more discussion regarding the construction and operation of a typical servo control circuit, see U.S. Pat. No. 5,262,907 entitled HARD DISC DRIVE WITH IMPROVED SERVO SYSTEM, issued Nov. 16, 1993 to Duffy, McKenzie, Heydari and Woods, assigned to the assignee of the present invention and incorporated herein by reference. It will thus be recognized that the cooperative operation of both the spindle motor control circuit 44 and the servo control circuit 46 cause the heads 30A, 30B to be positioned over a desired portion of the data tracks 18A, 18B in order to facilitate the reading of data from the discs and the writing of data to the discs.

The third functional block of the disc drive 10 identified in FIG. 2 is the read/write channel 42. It will be recognized that the function of this channel is to write information to the data tracks 18A, 18B and to subsequently read the information that has been previously written. Read/write channels are well known in the art and in the preferred embodiment, the read/write channel 42 includes the use of a PRML read channel.

FIG. 3 shows the read/write channel 42 to comprise an interface circuit 54 for controlling the passage of data to and from the host computer 40 of FIG. 2. In the preferred embodiment, the interface circuit 54 includes a conventional bus architecture controller with a buffer and error correction code (ECC) circuitry (not shown). Data to be written to the discs 16 is provided by the interface circuit 54 to an encoder circuit 56, which provides run-length limited encoded data to a pre-amp circuit 58, where the data is serialized and provided as a series of pulses to the read/write head 30A by way of signal path 62. For purposes of clarity, it will be understood that path 62 comprises two conducting paths for an inductive head and four conducting paths for an MR head.

The pre-amp circuit 58 includes a write driver (not shown) that provides a write current at a predetermined value and polarity in order to write the data to the disc 16. During a read operation, the data magnetically stored on the disc is sensed by the read/write head 30A and passed (by way of read signals) to the pre-amp circuit 58 and thereafter to a PRML read channel 60. As provided hereinabove, the PRML read channel 60 performs preliminary filtering of the read signals from the head 30A and then performs time-equalization (through the use of a transversal equalizer, not shown) in order to filter the input signals to a nominal waveform shape which is subsequently decoded using a Viterbi decoder in order to reconstruct the data from the disc 16A. Once the data is decoded by the PRML read channel 60, it is provided to the interface circuit 54. For additional discussion concerning PRML read channels, see U.S. Pat. No. 5,430,768 entitled IMPROVED MAXIMUM LIKELIHOOD DETECTOR FOR A DISC DRIVE PRML READ CHANNEL, issued Jul. 4, 1995 to Minuhin et al. and U.S. Pat. No. 5,459,757 entitled TIMING AND GAIN CONTROL CIRCUIT FOR A PRML READ CHANNEL, issued Oct. 17, 1995 to Minuhin et al. Both of these references are assigned to the assignee of the present invention and are incorporated herein by reference.

Having now concluded an overview of the disc drive 10 and the construction and operation of the read/write channel 42, the present discussion will now turn to the preferred embodiment of the present invention which optimizes read/write channel parameters in a disc drive so as to optimize the read error rate performance of the drive.

Figure 4:
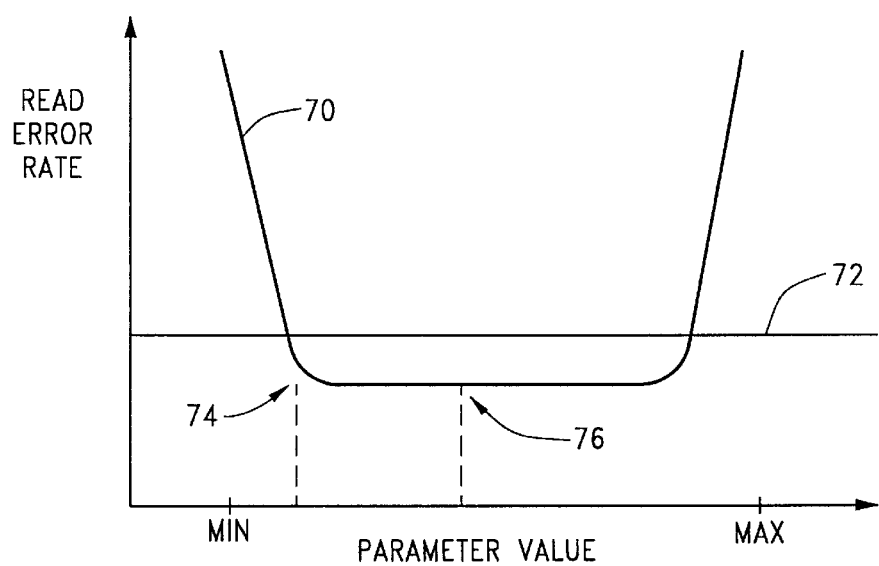
FIG. 4 is a graphical representation of nominal read error rate performance of the disc drive of FIG. 1 over a range of values of a selected read/write channel parameter.

By way of illustration, attention is first directed to FIG. 4 which provides a generalized graphical representation of the read error rates obtained from the disc drive 10 through the use of various values of a selected read/write channel parameter. More particularly, FIG. 4 shows a nominal error rate curve 70 plotted against a vertical axis generally indicative of read error rates (with it being understood that lower error rates are more desirable than higher error rates) and a horizontal axis generally indicative of different values for the selected parameter over a range defined from a minimum to a maximum value. As provided hereinabove, the particular parameter selected could be any one or a combination of the number of well known parameters used in the optimization of disc drive read performance, including pulse slimming values, prewrite compensation levels, adaptive filter values, inner and outer tap values, bandwidth values and the like, which are well known by those skilled in the art. Additionally, for purposes of clarity the parameter values of the horizontal axis generally represent a selected range of parameter values that are in turn used by the read/write channel 42 to obtain the corresponding error rates shown on the curve 70.

As shown, the curve 70 takes a shape preferred to as a "bucket", having well defined characteristics as the value of the selected parameter is incremented. An acceptance limit 72 is represented in FIG. 4 as a horizontal line, so that values of error rate below this limit are deemed to be within acceptable disc drive performance levels. Thus, generally any of the parameter values corresponding to points on the curve 70 below the acceptance limit 72 will initially provide acceptable read performance for the disc drive 10. For reference, the interdependent effects of multiple parameter values will be discussed in greater detail hereinbelow; the present discussion, however, will initially examine the effects on read error rate from changes in the value of a single parameter.

Thus, as provided hereinabove, prior art methodologies employing the first-minimum approach generally comprise incrementing the selected parameter value and measuring the resulting error rates until the first minimum read error rate is obtained. This error rate is generally identified at 74, so that the parameter value corresponding to this error rate would be used as the optimal parameter value. Additionally, prior art methodologies employing the absolute minimum approach continue measuring the read error rate over the entire range of parameter values and pick the parameter value corresponding to the best performance (i.e., minimum read error rate), such as indicated at point 76. Such prior art methodologies provide reasonably acceptable results for performance characteristics that are as well-behaved as the error rate curve 70 of FIG. 4, with the exception that the parameter value corresponding to the error rate at point 74 exhibits only a small amount of margin, being just below the acceptance limit 72.

Figure 5:
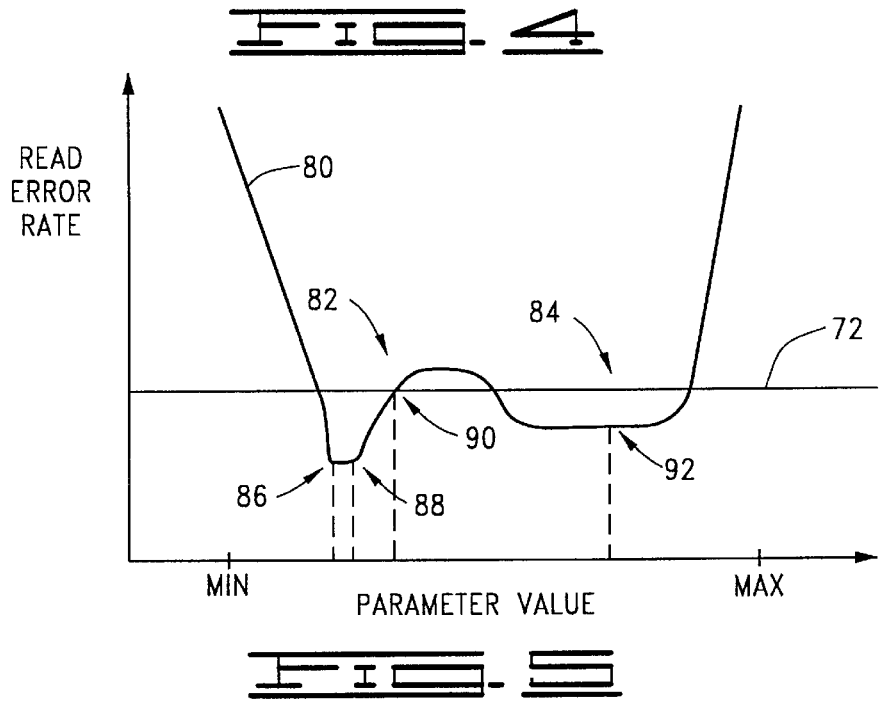
FIG. 5 is a graphical representation of the read error rate performance of the disc drive of FIG. 1 that can be obtained over a range of values for a selected read/write channel parameter.
Figure 5:
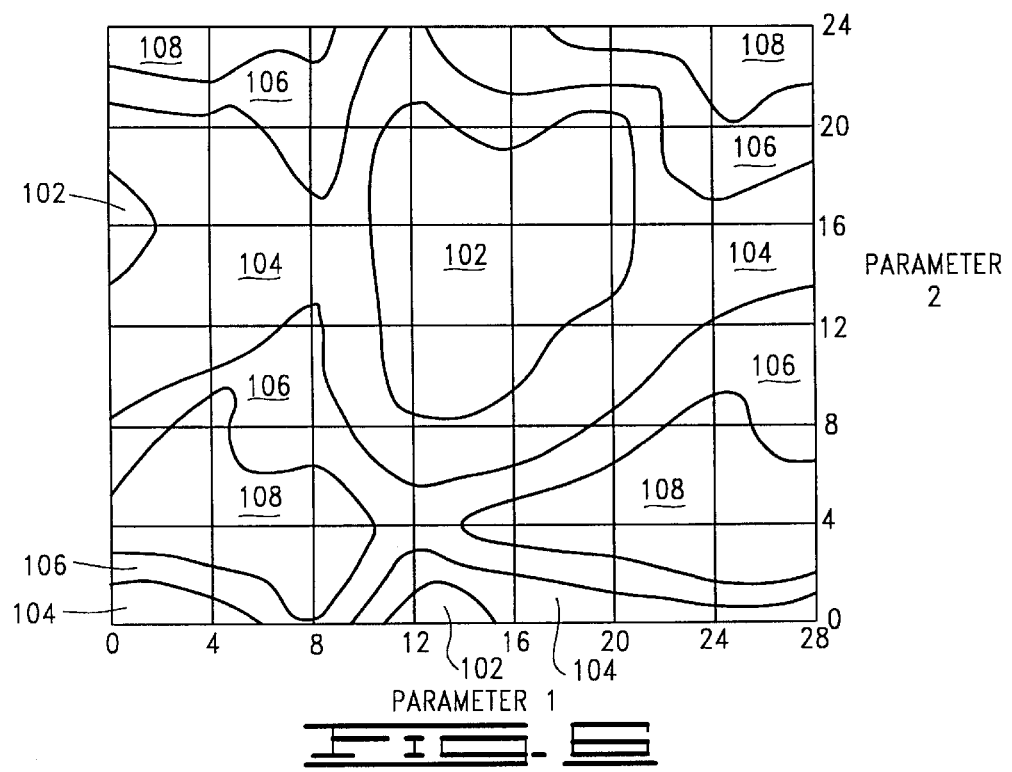

In practice, however, FIG. 5 provides a more realistic representation of disc drive performance that can typically be exhibited over a range of parameter values. More particularly, FIG. 5 provides an error rate curve 80 plotted in a similar manner as the error rate curve 70 of FIG. 4, but the error rate curve 80 is characterized as having a two-mode response. More particularly, FIG. 5 provides regions 82, 84 that are below the acceptance limit 72 (which is the same limit as in FIG. 5, for purposes of comparison). Using the first minimum approach, the parameter value selected would correspond to the first value on the error rate curve 80 below the acceptance limit (shown at 86). Likewise, using the absolute minimum approach, the parameter value selected would correspond to the minimum value on the error rate curve 80 (shown at 88).

As shown in FIG. 5, the point 88 is the minimum point of a localized peak at region 82. During disc drive operation, changes in environmental conditions can lead to changes in the electrical characteristics and performance of the read/write channel 42, with the result that the read error rate of the disc drive 10 will not be that represented at the value 88, but will be caused to "shift" upwards along the curve 80 either towards point 86 or point 90. In other words, because the surrounding parameter values provide relatively large changes in the effective error rates, the point may not be the optimal choice for the selected parameter value, as drive performance may be significantly affected by small changes in environmental conditions. Rather, selection of the parameter value corresponding to point 92 on the error rate curve 80 may be a better choice than that of point 88; whereas point 92 provides a greater error rate than point 88, performance is still well below the acceptance limit 72 and will be more robust in terms of changes in the operating characteristics of the drive.

Figure 6:
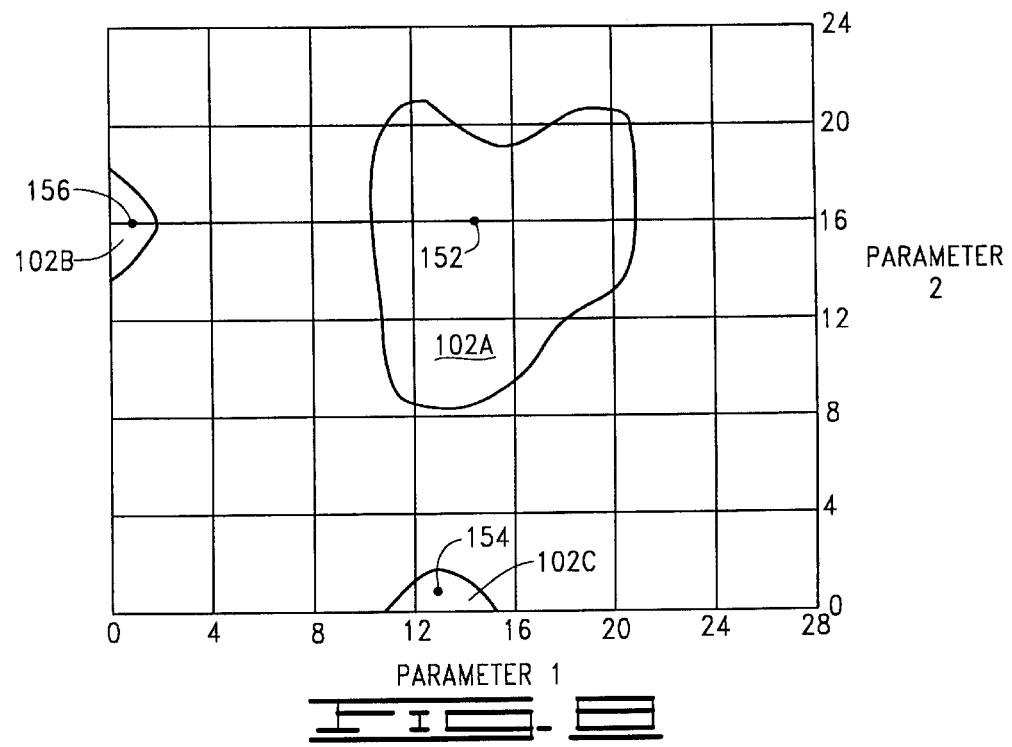
FIG. 6 is a three-dimensional, graphical representation of the read error rate performance of the disc drive over ranges of values for two selected read/write channel parameters.

Expanding the discussion of FIGS. 4 and 5 now to multiple parameters, reference is made to FIG. 6, which provides a generalized three-dimensional representation of read error rates for two selected parameters (parameter 1 and 2, respectively). More particularly, FIG. 6 presents a "contour map" type of graph, with the horizontal axis corresponding to a range of a first selected parameter, the vertical axis corresponding to a range of a second selected parameter, and the error rates represented in an elevational sense (that is, on a z-axis which is understood to extend in a direction orthogonally upward from the horizontal and vertical axes). Regions 102, 104, 106 and 108 identified in FIG. 6 correspond to increasing ranges of error rate values, with regions 102 corresponding to the minimum range and the regions 108 corresponding to the maximum range. Each line between the regions 102, 104, 106 and 108 indicates a transition from one range of error rates to the next.

For purposes of clarity, the graph of FIG. 6 has been adapted from read error rate data obtained using parameter values of write precompensation and outer tap level in a particular disc drive. It will be readily understood that such graphs for other disc drives and for other parameters will typically have different topographies as that shown in FIG. 6. A total of 28 distinct and uniformly spaced first parameter values are contemplated to be shown on the horizontal axis and a total of 24 distinct and uniformly spaced second parameter values are shown on the vertical axis; that is, each of the vertical and horizontal grid lines in FIG. 6 represents an interval of four parameter values. The elevation of each intersection of a selected first and second parameter value is indicative of the range of resulting read error rate.

The optimum parameter values for the first and second parameters shown in FIG. 6 are those that will result in a minimum error rate, so that selected pairs of parameter values that map into the various regions 102 would generally be the most viable candidates for such selection. Among these candidates, however, it will be recognized that some would be preferable to others, in terms of robustness (or relatively lower rates of change in error rates in neighboring pairs of parameter values). FIG. 6 shows the regions 102 to include a relatively large portion in the center of the graph exhibiting minimum read error rates, and so qualitatively it would be expected that the optimum parameter values would map into this portion; however, as provided hereinabove, in the selection of robust parameter values, the relative change in error rate with respect to location is as important a factor as the actual amount of the error rate. Thus, the optimum parameter values could map into one of the other portions 102 of FIG. 6.

Finally, FIG. 6 has been provided to illustrate the interaction of two parameters in a three dimensional representation. It will be recognized, however, that such analyses can be readily extended to multi-dimensions using a plurality of parameters (not just two), although the results of such analyses are not so easily represented as the two parameter graph of FIG. 6.

Having now concluded the discussion of the read error rate graphs of FIGS. 4–6, references made to FIG. 7, which shows a generalized flow chart of the method of the present invention, performed in conjunction with the disc drive 10 and the host computer 40. For purposes of disclosure, it is contemplated that these steps will be performed during the manufacturing cycle of the disc drive 10 during extended dynamic burn-in (DBI) testing.

Beginning at block 112, read error rates are obtained for ranges of selected parameter values. In performing this step, predetermined data test patterns are written to selected locations of the discs 16A, 16B and read by each of the heads 30A, 30B a number of times in a conventional manner. The resulting read error rates are determined by comparing the data read back from the discs 16A, 16B to the data test patterns and the computing the error rate as the ratio of the number of read errors over the total number of bits read. The ECC circuitry of the interface circuit 54 may be disabled as desired in order to calculate "raw" error rates, or the ECC circuitry may be left enabled so that "corrected" error rates are evaluated. In either case, a marketing specification will typically establish a maximum acceptable error rate (which generally corresponds to the acceptance limit 72 of FIGS. 4 and 5) and so the error rates will be determined generally in accordance therewith.

The parameters chosen for evaluation during the step of block 112 will depend upon a particular disc drive design and may include those parameters listed hereinabove, as well as others which are determined to significantly affect the operation of the read/write channel and require optimization in accordance herewith. The preferred embodiment contemplates the optimization of at least the values for the parameters controlling bandwidth, slimming, write precompensation and outer tap levels. Once the parameters are selected, the ranges for each of the parameters are identified and then the read error rates are determined for each value within each range of parameters, incrementing one parameter value at a time by some desired incrementation interval. The read results are then provided to the host computer 40 which determines the read error rates accordingly for each combination of parameter values. For purposes of evaluation, the read error rates for any two of the selected parameters could then be mapped into a graph such as the three-dimensional graph of FIG. 6.

The flow of FIG. 7 continues to region 104, wherein a repeatability measure is determined. The repeatability measure is an indication of the repeatability of the error rates and is generally related to the confidence level that would be assigned in predicting performance of the drive based upon selected parameter values. It is contemplated that the measurement of repeatability would be accomplished through the evaluation of a plurality of nominally identical disc drives to determine the resulting error rates for the associated parameter values and then a comparison of the range in these error rates for each set of parameter values. The repeatability measure is quantified as a value Δ, expressed in terms of the ranges in error rates obtained (this will be made more clear below).

The next step in FIG. 7 is at block 116, wherein a threshold T is set in accordance with the following relation:

$$T = \frac{\log(\text{min error rate value})}{\log((\text{min error rate value}) + \Delta)} \quad (1)$$

where the min error rate value is the best (minimum) error rate achieved during the foregoing testing of block 112 and Δ is the repeatability measure determined in block 114. It will be recognized that the determination of the threshold T will require a comparison of the read error rate values and the resulting selection of the minimum value therefrom. Further, the threshold T will have a value equal to or less than one (T≦1), depending upon the value of the repeatability measure Δ, that is, the higher the repeatability, the lower the value of the repeatability measure Δ and, correspondingly, the closer the threshold T will be to a value of one.

The flow of FIG. 7 continues at block 118, wherein a weight w for each combination of parameter values is calculated in accordance with the following:

$$w = \frac{\log(\text{actual error rate value})}{\log(\text{min error rate value})} \quad (2)$$

where the actual error rate value is that error rate value resulting from each unique combination of parameter values (hereinafter also referred to as each "error rate point") and the min error rate is the minimum (best) error rate among all of the points (and is the same value used in equation (1) hereinabove). Thus, as the best error rate will be the minimum error rate found during the testing of block 112, the weight of the point (or points) having the best error rate will be equal to one (w=1) and the weight of the remaining points will be less than one (w<1).

FIG. 7 continues at block 120, wherein the weight w of each point is compared to the threshold T and those points having a weight greater than the threshold (w>T) are selected, as shown. These selected points will have error rates that are relatively close in value to the best error rate and are shown in FIG. 8, which shows a two parameter error rate graph based upon the graph of FIG. 6. More particularly, the minimum error rate regions 102 of FIG. 6 are shown in FIG. 8 as 102A, 102B and 102C, respectively, and it will be understood that for purposes of illustration that these portions in FIG. 8 coincide with error rate points having weights w greater than the threshold T. That is, the regions 102A, 102B and 102C comprise continuous read error rate sets $M_1$, $M_2$, and $M_3$ respectively (collectively "$M_n$"). Each set $M_n$ of error rates includes at least one read error rate point having a weight w>T and all other points proximate thereto points located inside a boundary defined by error rates having weights w≦T. For each of these sets $M_n$, a center of gravity (COG) is next determined, as shown in block 122. Particularly, the COG is found by calculating a center of gravity for each parameter ($COG_p$) and then using the resulting ($COG_p$) values to map to the overall COG. Each of the $COG_p$ values is determined as:

$$COG_p = \frac{\Sigma_n(w_i)(x_i)}{\Sigma_n(x_i)} \quad (3)$$

where $w_i$ is the weight of each error rate point within the set $M_n$ and $x_i$ is the corresponding parameter value for each of these points. Thus, by determining a $COG_p$ for each parameter (such as for the parameters 1 and 2 in FIG. 8) for each of the regions 102A, 102B and 102C, the COG of each of these portions can be identified, as shown at points 152, 154 and 156, respectively.

The flow of FIG. 7 continues at decision block 124, where a global check is made of the weights of all the error rate points for the selected parameter ranges. If all weights are greater than the threshold (w>T), then the center of gravity determined from block 122 is the center of gravity of all the points; that is, the set $M_n$ would comprise all of the error rate points and there would be no outliers having weights w≦T. In such a case, the flow of FIG. 7 continues to block 126, wherein the optimum values for the selected parameters are determined to be the parameter values corresponding to the center of gravity, determined above. Thus, these parameter values are stored for subsequent use by the disc drive 10 and the flow ends at 128.

On the other hand, which will generally more likely be the case, there will be outliers present in the global population of read error rates having weights w<T; that is, there will be one or more sets $M_n$ (such as the sets $M_1$, $M_2$, and $M_3$ corresponding to regions 102A, 102B and 102C in FIG. 8). In such a case, the flow of FIG. 7 continues at block 130, wherein the error rate points having weights w>T are again selected. In terms of the example of FIG. 8, the points lying within the regions 102A, 102B and 102C will thus be identified.

Next, at block 132, the average and standard deviation are in turn calculated for the neighboring points to each of these points selected in block 130; that is, using a given interval distance, those points immediately adjacent each point and having a weight w>T are used to determine an average and standard deviation. The operation of block 132 can be illustrated with reference to FIG. 9, which shows an enlarged subset of the portion 102A of FIG.8. Each intersection of the horizontal and vertical lines making up the grid of FIG. 9 represents an individual error rate point, resulting from the values of the parameters 1 and 2, as shown (for purposes of clarity, the scaling of FIG. 9 is different from the scaling of FIG. 8).

Figure 9:
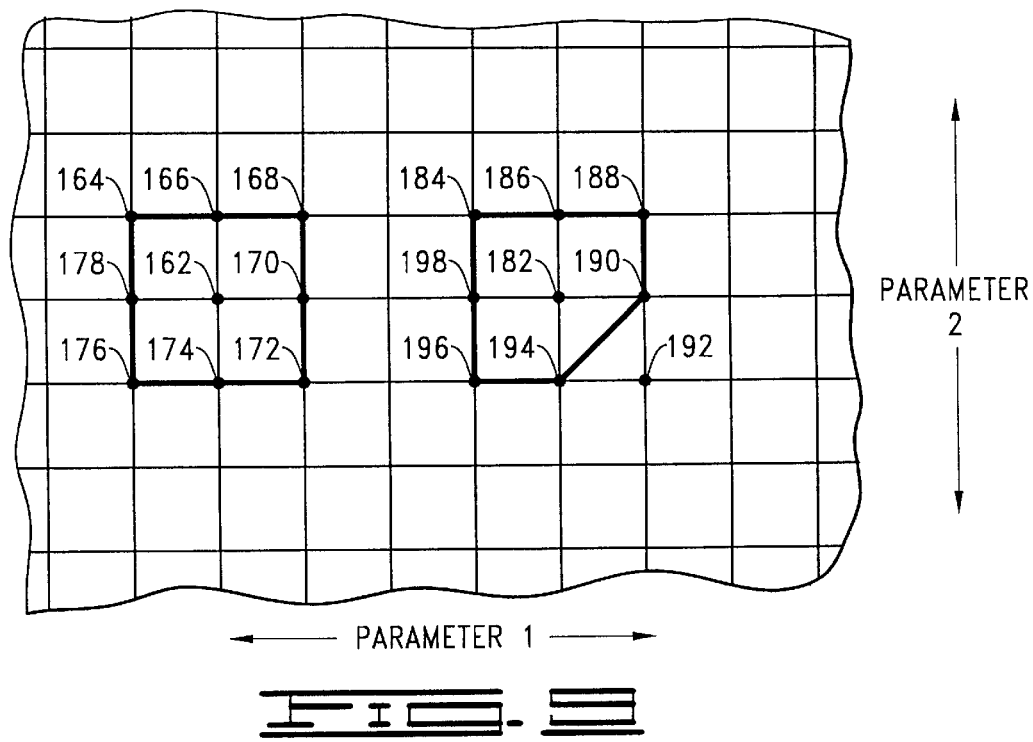
FIG. 9 is a graphical representation of a subset of a selected portion of FIG. 8 showing adjacent neighboring error rate points in relation to selected error rate points.

As shown in FIG. 9, during the operation of block 132 of the flow of FIG. 7, point 162 will be selected in turn, as point 162 is understood to have a weight w>T and be included in the region 102A. The eight immediately adjacent error rate points 164, 166, 168, 170, 172, 174, 176 and 178 are next identified, and an average (avg) and standard deviation (σ) are calculated among those points 164, 166, 168, 170, 172, 174, 176 and 178 having weights greater than the threshold (w>T). For point 162, all of the immediately adjacent error rate points 164, 166, 168, 170, 172, 174, 176 and 178 are contemplated as having weights w>T, so that the average and standard deviation are determined for all eight of these points.

During the operation of block 132, point 182 (which is also included in the region (102A) will in turn be evaluated and the eight immediately adjacent error rate points 184, 186, 188, 190, 192, 194, 196 and 198 will be identified. In this second case, however, it is contemplated that the point 192 will have a weight w≦T, so that the error rate value for the point 192 will not be included in the determination of the average and standard deviation for the point 182; that is, only the seven adjacent points 184, 186, 188, 190, 194, 196 and 198 will be used. It will be understood that the same determinations are made for the remaining points in the region 102A as well as for all of the points located within the regions 102B and 102C of FIG. 8.

Once the averages and standard deviations have been determined for the neighboring points for each point having a weight w>T, the flow of FIG. 7 continues at block 134, wherein a difference value D is determined for each point in accordance with the following relationship:

$$D = \text{avg} - \sigma \qquad (4)$$

where avg represents the average and σ represents the standard deviation determined for each point, respectively, in block 132. It will be recognized that the point having the largest value of D represents the most stable point and generally has the tightest distribution (or at least amount of variation among neighboring points). Although equation (4) represents the preferred approach to characterizing the variation D, alternative approaches will be readily apparent, such as taking the difference between the average and a selected multiple of the standard deviation that is not equal to one (such as using a multiplication coefficient for the standard deviation of three, so that D is determined as the difference between the average and 3σ).

Thus, the error rate point corresponding to the largest value of D (among the various sets $M_n$, such as regions 102A, 102B, and 102C of FIG. 8) will be chosen as the optimal operating point (as shown in block 136), and the corresponding parameter values that map to this point are selected as the optimal parameter values which are stored and subsequently used during operation of the disc drive 10.

Figure 10:
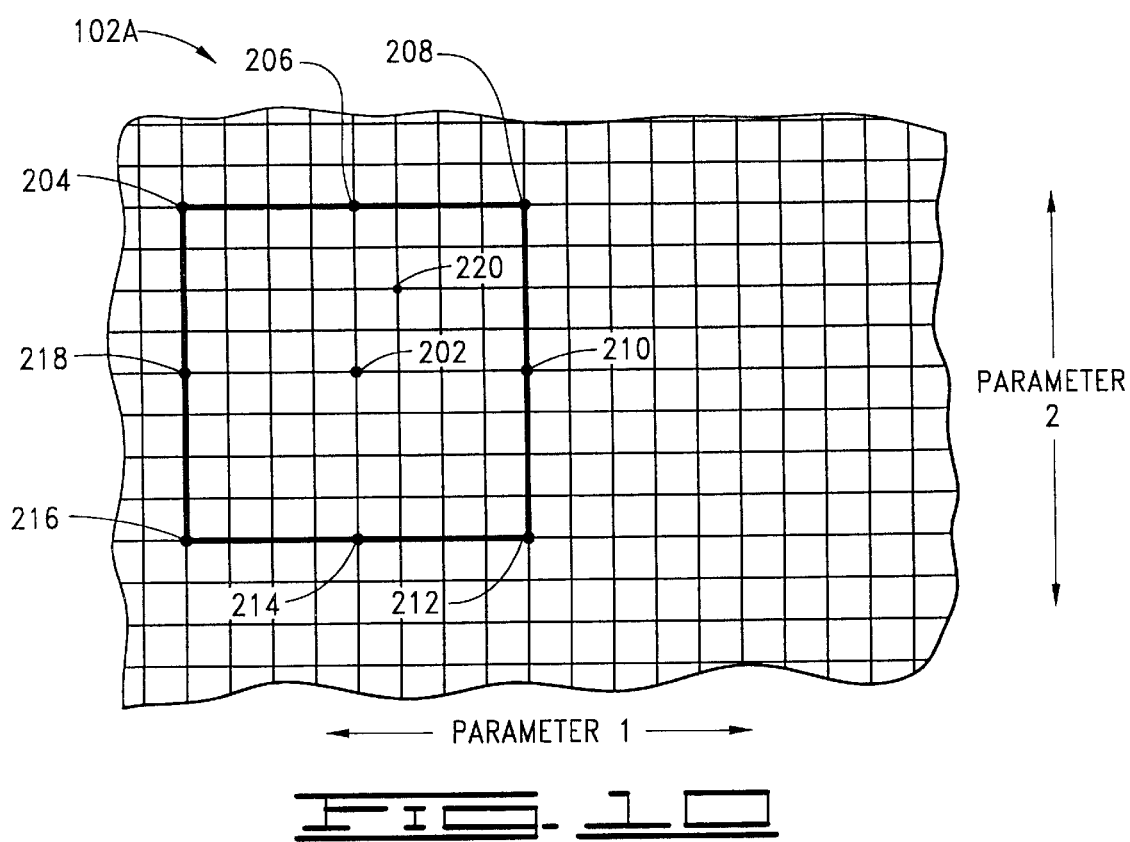
FIG. 10 is an alternative graphical representation of a subset of a selected portion of FIG. 8 showing adjacent neighboring error rate points in relation to selected error rate points.

It will be recognized that the neighborhood range used hereinabove with reference to block 132 comprised the eight immediately adjacent points to each point (as shown in FIG. 9), so that the distance between the center point and the neighboring points comprised a distance of one increment in parameter value. However, it will be recognized that a distance greater than one increment can be used, as desired, such as a distance of four parameter value increments as shown in FIG. 10. More particularly, using a neighborhood for point 202 (which is included in the region 102A of FIG. 8) comprising neighboring points 204, 206, 208, 210, 212, 214, 216 and 218 which are four increments away from point 202, the operation of block 136 can be performed as described hereinabove with an additional step that, once the point having the largest value of D is identified, a center of gravity is calculated in a manner similar to that described with reference to block 122 for the neighboring points 204, 206, 208, 210, 212, 214, 216 and 218, the center point 202, as well as the points located therebetween. For example, such a center of gravity is identified at point 220 and this point would identify the optimal parameter values as before.

Likewise, in situations wherein more than two parameters are evaluated concurrently (i.e., a multi-dimensional analysis), it will be readily apparent that the neighborhood for each of the selected points will comprise a number of points greater than the eight points illustrated with the use of only two parameters. Such multidimensional extensions are well known by those skilled in the art.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for optimizing parameter values in a read/write channel of a disc drive, comprising the steps of:
   (a) obtaining a population of error rate points for selected ranges of a plurality of input parameter values, the population of error rate points characterized as a set of individual error rate points, each error rate point having a corresponding error rate value resulting from a unique combination of input parameter values;
   (b) determining a weight for each of the error rate points using a minimum error rate value from the population of error rate points obtained in step (a);
   (c) determining a center of gravity from error rate points having associated weights greater than a selected threshold, the center of gravity corresponding to a unique combination of parameter values:
   (d) when all of the error rate points have associated weights greater than the threshold:
      (i) storing the unique combination of parameter values corresponding to the center of gravity; and thereafter,
      (ii) using the stored parameter values during operation of the read/write channel: and
   (e) when at least one of the error rate points has an associated weight that is less than or equal to the threshold:
      (i) identifying each set of error rate points bounded by error rate points having weights that are equal to or greater than the threshold;
      (ii) characterizing variation in error rates among neighboring error rate points for each of the error rate points in each set of points;
      (iii) storing the parameter values corresponding to the error rate point having the least variation: and thereafter
      (iv) using the stored parameter values during operation of the read/write channel.

2. The method of claim 1, wherein the step of determining a weight for each of the error rate points using the minimum error rate value in the population comprises the steps of identifying the minimum error rate value in the population and, for each of the error rate points, determining the weight from the ratio of the error rate value for the error rate point to the minimum error rate value in the population.

3. The method of claim 1, wherein the step of identifying selected error rate points having corresponding weights that are less than a selected threshold comprises the step of determining the selected threshold from the minimum error rate value in the population and a repeatability measure, the repeatability measure indicative of the variation in error rate values for selected error rate points using corresponding parameter values over a plurality of nominally identical disc drives.

4. The method of claim 1, wherein the step of characterizing the variation in error rate values among neighboring error rate points for each of the selected error rate points comprises the steps of, for each of the selected error points, determining an average and a standard deviation of the error rate values for the neighboring error rate points and characterizing the variation as the difference between the average and a selected multiple of the standard deviation.

5. In a disc drive having a disc and an actuator adjacent the disc, the actuator including a head for the respective writing and reading of data to and from data tracks on a surface of the disc, the disc drive including read/write channel circuitry utilizing a plurality of read/write channel parameters having values selected to optimize the writing and reading of the data by the disc drive, an improved method for selecting the parameter values for the read/write channel circuitry comprising the steps of:

a over selected ranges of the parameter values, characterizing the disc drive operational performance for each of a unique combination of parameter values as a population of individual error rate points, each of the error rate points having a corresponding error rate value, each of the error rate values characterized as a measure of the number of errors present in a selected amount of data read by the disc drive;

(b) using a minimum error rate value from the population of individual error rate points to determine a weight for each of the error rate points;

determining a center of gravity from error rate points having associated weights greater than a selected threshold, the center of gravity corresponding to a unique combination of parameter values;

(d) when all of the error rate points have associated weights greater than the threshold:
        (i) storing the unique combination of parameter values corresponding to the center of gravity: and thereafter,
        (ii) using the stored parameter values during operation of the read/write channel; and when at least one of the error rate points has an associated weight that is less than or equal to the threshold:
        (i) identifying each set of error rate points bounded by points having weights that are equal to or greater than the threshold:
        (i) characterizing variation in error rate values among neighboring points for each of the points in each set of points:
        (iii) storing the parameter values corresponding to the point having the least variation, and thereafter.
        (iv) using the stored parameter values during operation of the read/write channel.

6. The improved method of claim 5, wherein the step of using the minimum error rate value from the population of individual error rate points to determine a weight for each of the error rate points comprises the steps of identifying the minimum error rate value in the population and, for each of the error rate points, determining the weight from the ration of the error rate value for the error rate point to the minimum error rate value in the population.

7. The improved method of claim 5, wherein the step of identifying selected error rate points having corresponding weights that are less than a selected threshold comprises the step of determining the selected threshold from the minimum error rate value in the population and a repeatability measure, the repeatability measure indicative of the variation in error rate values for selected error rate points using corresponding parameter values over a plurality of nominally identical disc drives.

8. The improved method of claim 5, wherein the step of characterizing the variation in error rate values among neighboring error rate points for each of the selected error rate points comprises the steps of, for each of the selected error points, determining an average and a standard deviation of the error rate values for the neighboring error rate points and characterizing the variations as the difference between the average and a selected multiple of the standard deviation.

9. In a disc drive of the type having a rotatable disc and a head controllably positionable adjacent tracks defined on a surface of the disc, the disc drive further having a read/write channel operably connected to the head for writing and subsequently reading data to and from the tracks, respectively, a method for optimizing values of parameters used by the read/write channel, characterized by:

(a) sequentially varying the value of each of the parameters to be optimized over each of a selected range of values to provide a plurality of unique combinations of parameter values;

(b) determining an error rate for each combination;

(c) determining a threshold for each combination in relation to the associated error rate and a minimum error rate from the error rates determined in step (b);

(d) determining a weight for each combination in relation to the associated error rate and the minimum error rate;

(e) determining a center of gravity from combinations having associated weights greater than the threshold;

(f) when all of the combinations have associated weights greater than the threshold:
        (i) storing parameter values corresponding to the center of gravity; and thereafter,
        (ii) using the stored parameter values during operation of the read/write channel; and (g) when at least one of the combinations has an associated weight that is less than or equal to the threshold:
        (i) identifying each set of combinations bounded by combinations having weights that are equal to or greater than the threshold;
        (ii) characterizing variation in error rates among neighboring combinations for each of the combinations in each set of combinations;
        (iii) storing parameter values corresponding to the combination having the least variation; and thereafter,
        (iv) using the stored parameter values during operation of the read/write channel.

* * * * *